(12) United States Patent
Magaldi

(10) Patent No.: US 8,567,594 B2
(45) Date of Patent: Oct. 29, 2013

(54) DEVICE FOR RECOVERING FINES AND RELATED METHOD

(75) Inventor: Mario Magaldi, Salerno (IT)

(73) Assignee: Magaldi Industrie S.R.L., Salerno (IT)

( * ) Notice: Subject to any disclaimer, the term of this patent is extended or adjusted under 35 U.S.C. 154(b) by 399 days.

(21) Appl. No.: 12/991,949

(22) PCT Filed: May 12, 2009

(86) PCT No.: PCT/IB2009/051943
§ 371 (c)(1),
(2), (4) Date: Jan. 20, 2011

(87) PCT Pub. No.: WO2009/138949
PCT Pub. Date: Nov. 19, 2009

(65) Prior Publication Data
US 2011/0139580 A1    Jun. 16, 2011

(30) Foreign Application Priority Data

May 12, 2008   (IT) .............................. RM2008A0253

(51) Int. Cl.
*B65G 45/14* (2006.01)
*B65G 45/10* (2006.01)

(52) U.S. Cl.
USPC ............................ 198/701; 198/703; 198/713

(58) Field of Classification Search
None
See application file for complete search history.

(56) References Cited

U.S. PATENT DOCUMENTS

| 1,437,415 | A | | 12/1922 | Hauter |
| 3,881,590 | A | | 5/1975 | Hartmann |
| 5,564,878 | A | * | 10/1996 | Kay ........................... 414/141.1 |

FOREIGN PATENT DOCUMENTS

| DE | 3641964 | 10/1987 |
| EP | 0471055 | 2/1992 |
| EP | 0508916 | 10/1992 |
| EP | 1409380 | 4/2004 |
| FR | 2691320 | 11/1993 |
| WO | 03013991 | 2/2003 |

OTHER PUBLICATIONS

PCT International Search Report for PCT/IB2009/091543 filed on May 12, 2009 in the name of Mario Magaldi.
PCT Written Opinion for PCT/IB2009/091543 filed on May 12, 2009 in the name of Mario Magaldi.

* cited by examiner

*Primary Examiner* — Kavel Singh
(74) *Attorney, Agent, or Firm* — Steinfl & Bruno LLP

(57) ABSTRACT

Device for recovering fines constituted by a dragging conveyor/loop elevator equipped with scrapers/collecting cups (4) moved by a catenary link according to a closed path and associated to a plate conveyor supported by chains or metallic belt, which conveyor is equipped with pendula/pushers hinged to the transport plates themselves.

21 Claims, 4 Drawing Sheets

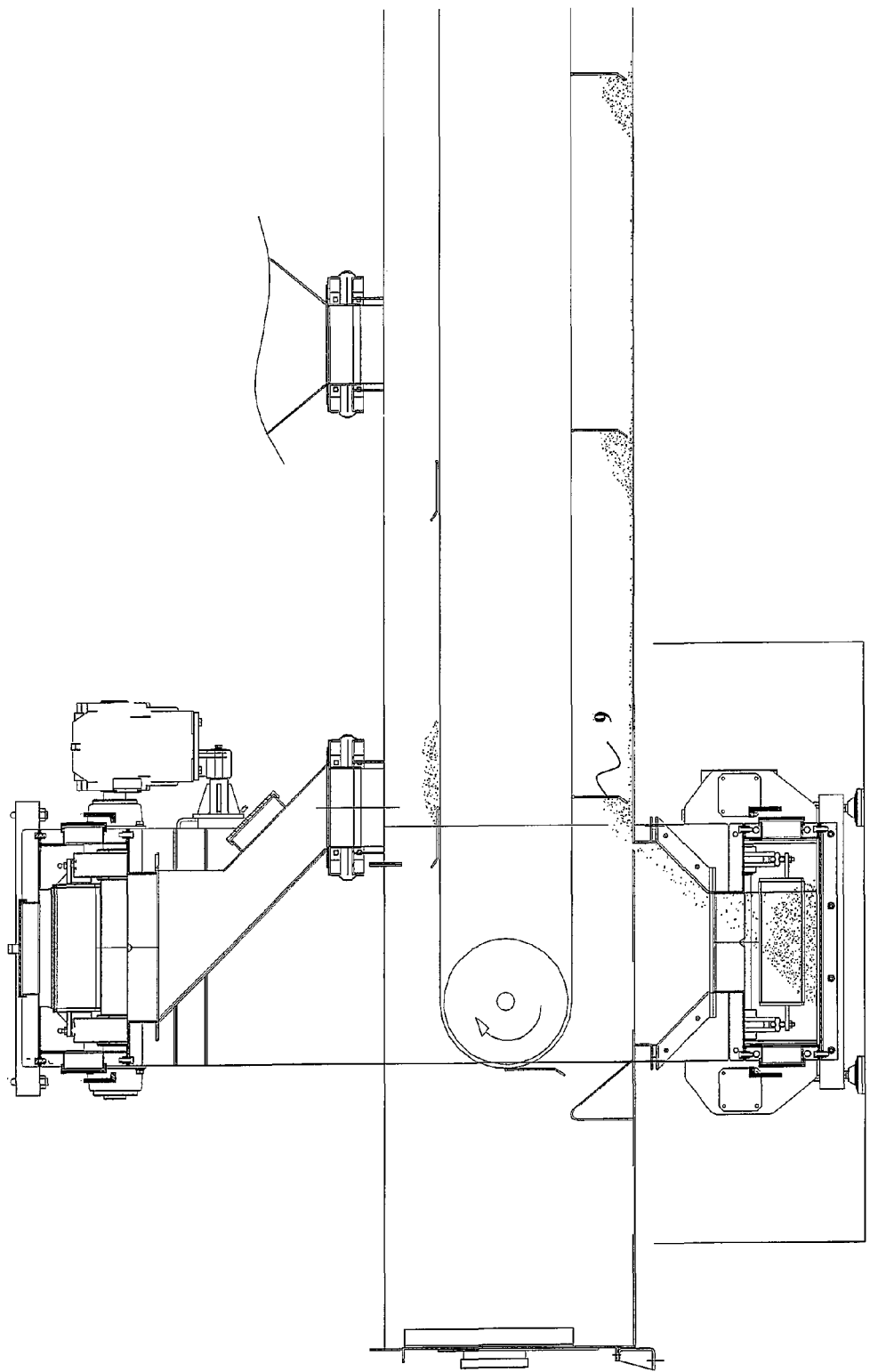

DEVICE FOR RECOVERING FINES AND RELATED METHOD

CROSS REFERENCE TO RELATED APPLICATIONS

The present application is the US national stage of International Application PCT/IB2009/051943 filed on May 12, 2009 which, in turn, claims priority to Italian Application RM2008A000253, filed on May 12, 2008.

FIELD OF THE INVENTION

The present invention relates to a device for recovering fines depositing on the bottom of an extractor and/or other plate conveyor supported by chains or metallic belt, for example in plants for extracting ashes or the like or however for moving loose material containing a fine fraction. The invention also relates to a corresponding method for recovering fines.

BACKGROUND OF THE INVENTION

In the ash dry extraction plant illustrated in EP 0 471 055 B1, the system for recovering fines from the bottom of the extractor and/or of the metallic conveyor placed downstream of the primary extractor is made of scraping chain conveyors indeed positioned onto the bottom, the scraping members thereof, dragged by the conveyor chain, convey the fines which are present onto the bottom of the main conveyor to the discharge of the same.

Systems for cleaning the conveyor bottom are also illustrated in EP 1 409 380, wherein specific buckets hinged to the plates of the metallic conveyor belt, in association with the bottom of the conveyor itself, exert a dragging action of the fines and, in association with a metallic shield placed at the return, they provide the action of recovering fines which are partially brought again by the buckets themselves onto the bearing tract of the main conveyor.

Both said known systems have some drawbacks.

In the first case, the scraping chain conveyor operates wholly dipped into the same atmospherical environment of the belt bearing the ashes. However, the excessive heat transmitted by the transported material makes unadvisable the use of the classical systems for recovering the fines integrated in the same carter of the closed main conveyor.

In the second case, the association of the shield at the return with the recovery members hinged to the plates of the conveyor belt does not avoid the accumulation of fine material at the return itself, by causing a anomalous wear of the conveyor belt which at last drags into the not recovered material. The latter, if highly abrasive, can quickly destroy the integrity of the conveyor belt itself.

Both cases have in common the early wear of the scraping members and of the bottom portions therewith they are constantly in contact.

Another known system for recovering the fine material consists in scraping chains with C-like profile. They are typically installed onto the bottom of the conveyor thereto they are associated and they are characterized by a vertical transportation area placed at the return field of the conveyor itself.

The function is that of recovering the fine in the horizontal tract and to re-convey it onto the loading area of the main conveyor. Said systems, apart from the drawbacks associated to the two cases mentioned above, are characterized by a high wear of the conveyor chain.

In fact, the diameter of the guide wheels and winding rate being equal, the wear extent in the contact points of the catenary meshes is proportional to the number of used guide wheels.

In the catenary with C-like profile, the number of guide wheels not lower than six and the changes in the winding direction on the return guide wheels determine a quick wear of the chain meshes.

SUMMARY OF THE INVENTION

The present invention obviates the drawbacks mentioned above by means of a device according to claim 1 and a method according to claim 20.

In particular, the present invention relates a device for recovering fines constituted by a dragging conveyor/loop elevator associated to a metallic plate conveyor and to pendula/pushers hinged to the plates of the conveyor itself.

The main advantages achieved by the present invention are of:

- making more compact the application as a whole, thanks to the fact that the conveyor equipped with said recovery device becomes less cumbersome in height due to the absence of the recovery system with dragging chain provided onto the bottom;
- simplifying the inspection/maintenance operations, the recovery system object of the invention being localized in a single cross section of the plate conveyor;
- eliminating wears of the bottom of the conveyor thereto it is associated and minimizing those of the recovery members connected to the catenary as well as of the meshes of the catenary itself;
- allowing, differently from the previous scraping chain systems localized onto the conveyor bottom, to implement metallic plate conveyors wholly equipped with systems for recovering fines also with big interaxes, beyond the possible length in implementing a scraping chain;
- eliminating the problems of insufficient resistance to the temperature of the traditional scraping chain recovery systems which, as illustrated above, as they are wholly associated to the plate conveyor, if contained in metallic container, are dipped into the same high temperature atmospheric environment; this condition, apart from a certain temperature value, nullifies the hardness induced by the hardening thermal treatments necessary in the conveyor chains operating in abrasive environments. The metallic container of the invention device can communicate with the plate conveyor of closed type only at the loading point and at the discharging point and at these points it can be equipped with valves with cyclic opening, of the double clapet type or equivalents, so as to carry out a separation of the environments: this eliminates the heat transmission from the material transported to the recovery chain;
- allowing the independent maintenance of the invention device even when associated to boiler bottom ash extractor: the environment separation, performed by the valves with cyclic closure, of the double clapet type or equivalents, positioned at the loading and discharging points, allows maintenance operations absolutely safe from possible boiler over-pressures.
- eliminating fine lumps in areas of the plate conveyor bottom not involved by the action of the recovery members.

BRIEF DESCRIPTION OF THE FIGURES

Other advantages, features and using modes of the present invention will result to be evident from the following detailed description of some preferred embodiments, shown by way of example and not for limitative purposes. The figures of the enclosed drawings will be referred to, wherein:

FIG. 4 shows schematically the interaction between pendula/pushers of the plate conveyor of FIG. 3 with the dragging conveyor/chain elevator of FIG. 1.

DETAILED DESCRIPTION OF THE INVENTION

By referring to the enclosed figures, an elevator/fine recovering device according to the present invention is designated as a whole with 1. As already said, the device 1 is apt to recovery the fines which deposit onto the bottom of an extractor and/or other plate conveyor supported by chains or metallic belt, used in plants for extracting ashes or the like or however to move loose material containing a fine fraction.

Figure 1:
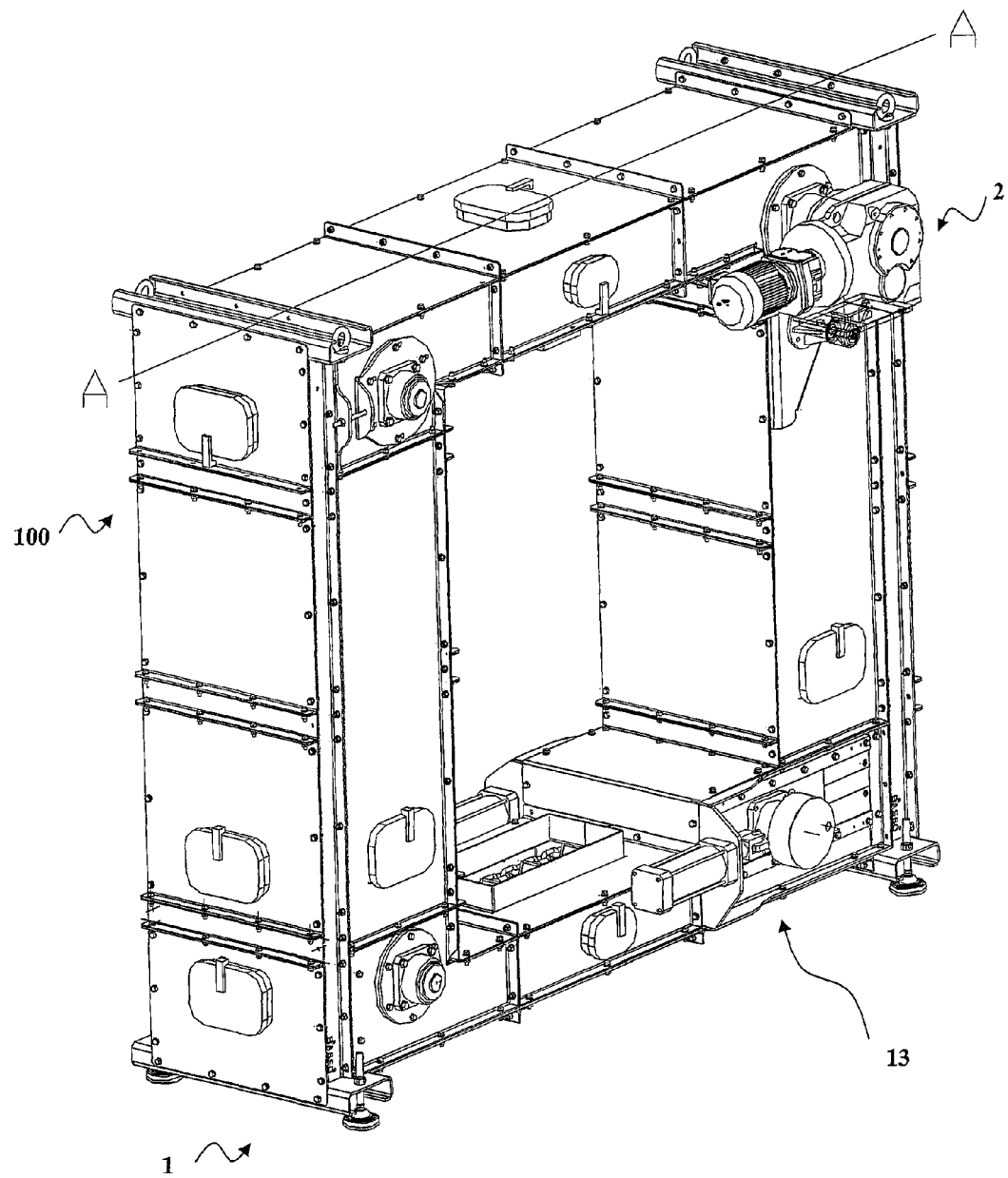
FIG. 1 shows a general scheme of a preferred embodiment of the invention device which in this case consists in a dragging conveyor/loop elevator.
Figure 2:
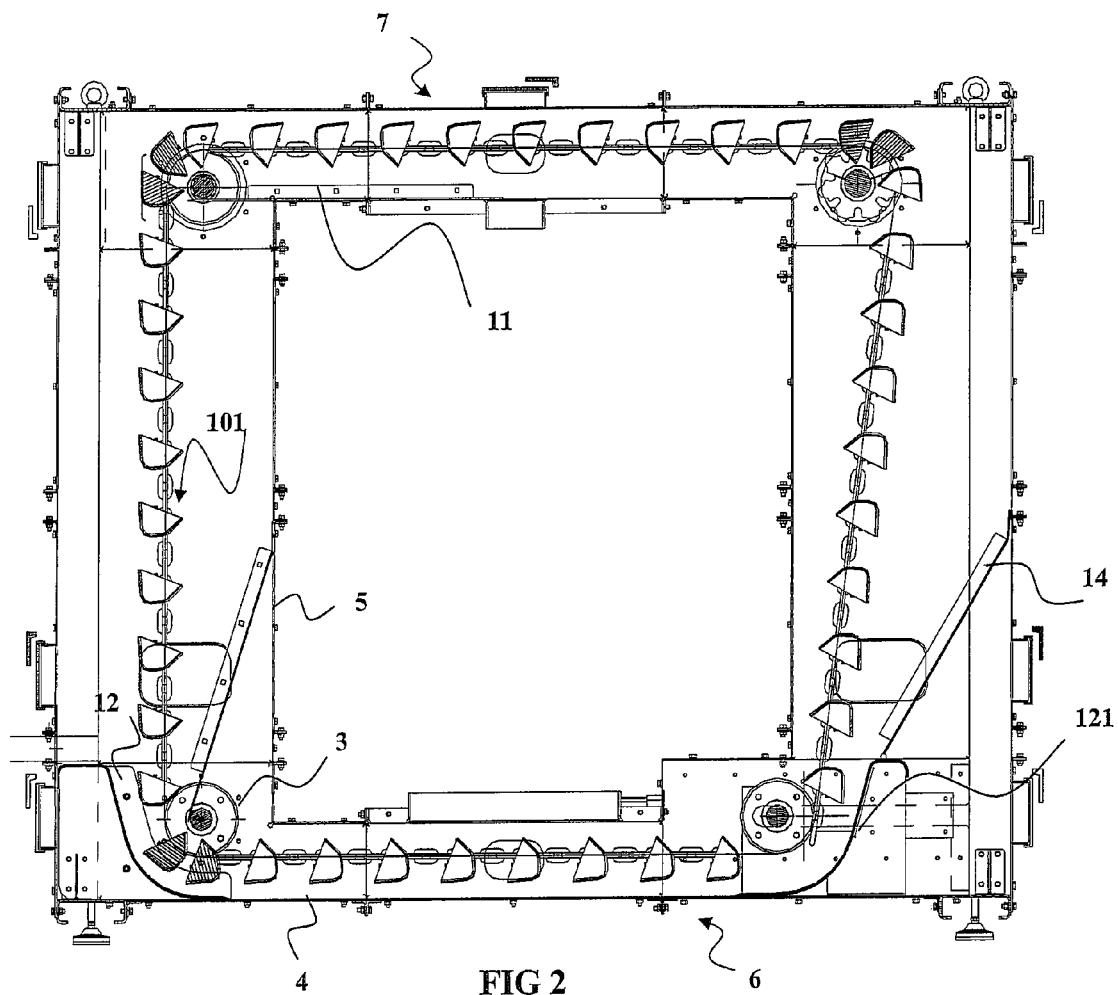
FIG. 2 shows a section of the dragging conveyor/loop elevator according to the line A-A of FIG. 1.

The device 1 comprises a fixed frame 100 made of metal and motion means 2 comprising a motor, a tensioning system 13 and a traction organ constituted by a link of catenary 101 sliding on four wheels, these last ones visible in FIG. 2 and each one designated with 3. Of such wheels 3, one is toothed and driving and connected to the motor and the other ones are smooth and act as return. The wheels 3 are placed substantially at the angles of a quadrilateral. According to the configurations, the driving toothed wheels can be more than one.

The catenary 101 is wholly included in a metallic container 5 equipped with inspection ports.

The link of catenary 101 supports a plurality of members for collecting fines, in particular of the cup-like dragging type, each one designated with 4, arranged according to a substantially constant pitch. The shape of such collecting members 4 is so that in the lower branch of the catenary, by way of example designated with 6 in FIG. 2, the scrapers/cups 4, while removing the material on the bottom, load as much as to be able to transport it in elevation and position it onto the upper tract 7 of the catenary to convey it to the point interfacing with the main conveyor designated with 8.

Figure 3:
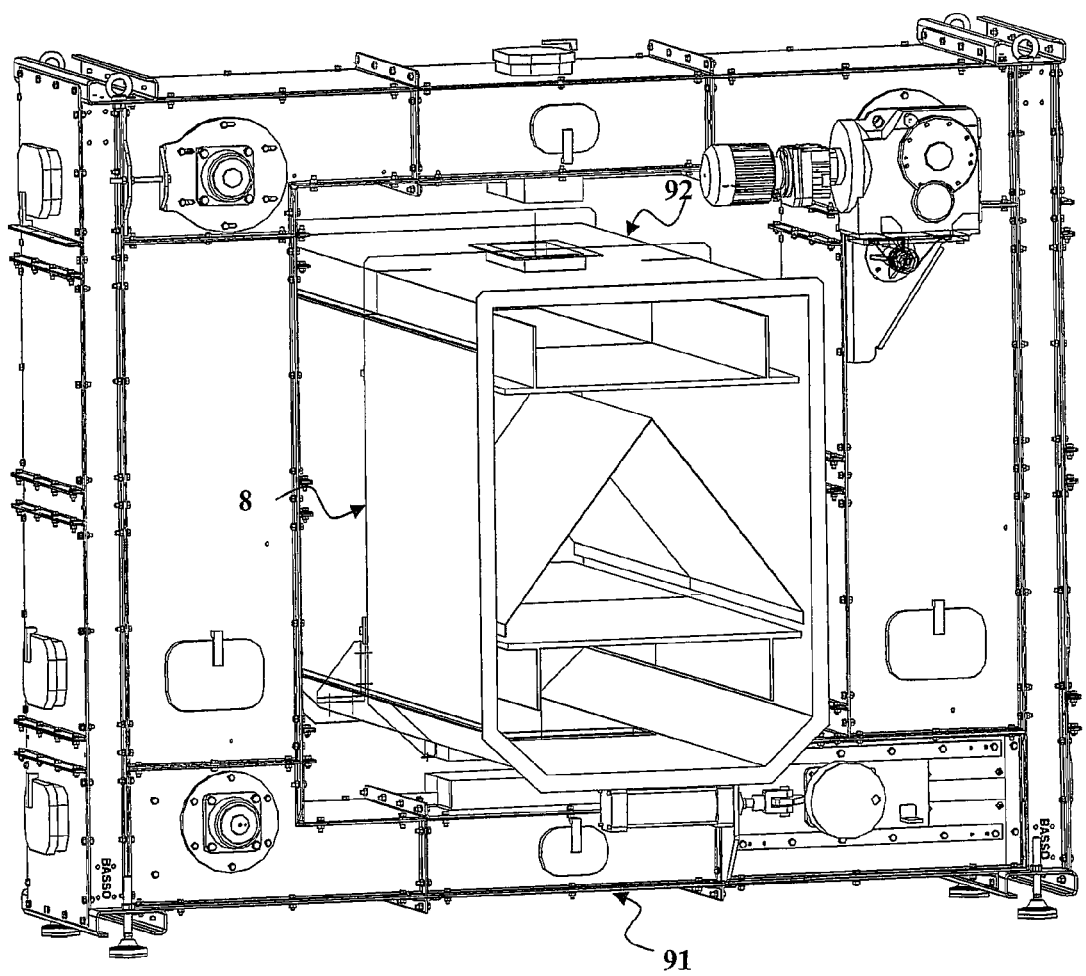
FIG. 3 shows the association of the dragging conveyor/elevator of FIG. 1 to a plate conveyor of closed type.

As shown in FIG. 3, the metallic frame 100 of the device 1 develops like a loop outside the plate conveyor thereto it is associated 8, and preferably it is connected thereto at two interface regions, a lower one 91 and the upper other one 92, with predetermined size.

The conveyor considered in this case can be, for example, of the type described in EP 0 471 055 B1, the related description thereof is herein incorporated to this purpose by means of this reference.

The lower opening 91 connects the bottom of the plate conveyor 8 with the cover of the lower branch of the link of catenary 101 and it identifies the loading point of the device 1.

The upper opening 92 connects the bottom of the upper branch of the link of catenary 101 with the conveyor 8 and it identifies the discharging point of the device 1.

Preferably, the device 1 is positioned in an area of the conveyor 8 upstream of the loading section of the latter, but in case of great quantities of materials to be recovered and/or big interaxes it can be convenient applying more recovery devices 1 distributed along the development of the conveyor itself.

The device 1 allows then to recover the fine which is present on the bottom of the conveyor 8 thereto it is associated and to recycle the fine material recovered at the loading point of the conveyor itself.

In fact, during the return run of the conveyor 8, the fine is dragged onto the bottom of the conveyor itself by means of pendula/pushers 9 integral to the plates of the latter and so as not to touch the bottom of the conveyor as highlighted in FIG. 4. It is provided that the pendula/pushers 9 work on a state of lump fine material so as to eliminate wears of the conveyor bottom.

In this phase the pendula/pushers 9 position vertically in the area between return belt and bottom and transfer the fine which is present on the bottom of the conveyor 8 towards the return area, until reaching the point interfacing with the device 1. In this interface point the fine material accumulated by each pendulum/pusher 9 precipitates onto the bottom of the device 1 and it is recovered by the scrapers/cups 4 supported by the catenary link.

It is to be underlined that in order to limit to the minimum the wears of the recovery members 4 they never come in contact with the bottom of the metallic container of the horizontal branches 6 and 7. Said total absence of contact is guaranteed by a constant tensioning 13 of the catenary.

In particular on the lower horizontal tract 6 it is provided that the recovery members 4 drag into the fine material which is present therein, thus eliminating the wear of the metallic bottom.

On the upper horizontal tract, upstream of the guiding smooth wheel 3, a horizontal abutment member, or tile, 11 is provided preventing the fine material from falling down to the ascending tract. The interaction of each scraper/cup 4 with said horizontal fixed tile 11 guarantees feeding the fine material to the conveyor 8 through the point 92 interfacing with the conveyor itself.

On the contrary, at each one of the lower guide wheels 3, curved abutment members, or tiles, 12 are provided which cooperate with the scrapers/cups 4 to reduce material lumps at the corresponding angles of the metallic container.

The curved tile 121 is integral to the carriage of the tensioning system 13, of pneumatic or equivalent type, associated to the catenary 101 and the slanted tile 14 has one side hinged to the curved tile 121 to follow the carriage run, the other one fixed and adhering to the wall of the metallic container.

The presence of the mentioned tiles 12, 121 and 14 avoids lumps of fine material in points of the metallic container not involved by the passage of the scrapers/buckets 4 and it improves the whole performances of the device 1.

According to the specific operating configuration, the connection between the metallic container of the recovery device 1 and the conveyor 8 can provide connecting channel/hoppers properly tilted to facilitate the material fall. The number of interface points which are present at the lower horizontal branch 6 can even be more than one according to the number and the arrangement of the pendula/pushers 9 with respect to the width of the transport plates thereto they are connected.

It will appreciated that the device 1 is particularly advantageous even in case of applications thereof to a metallic plate conveyor of closed type inside thereof the transported material is cooled with countercurrent air. In fact, differently from what happens for the traditional systems, the fines' dragging onto the conveyor bottom, performed by the air during the cooling process, cooperates with the cleaning system in conveying the fines towards the return area of the conveyor 8 which may coincide with the loading point of the loop conveyor associated thereto.

Furthermore, the use of valves with cyclic closure of the type with double clapet or equivalents, positioned at each interface point 91, 92, apt to separate the environment of the recovery device 1 from the environment of the main conveyor 8, results to be particularly advantageous. This determines the possibility of implementing the maintenance of the chain of the device 1 during the forward motion of the conveyor 8 of closed type when the same is associated to the ash extraction from fossil fuel boilers. In fact, in these cases by separating with said valves the feeding area 91 and the discharging area 92 between the recovery conveyor 1 and the main conveyor 8, the two environments are isolated by allowing to perform the maintenance of the recovery device 1 without exposing the operator to the risk of possible pressure flushes of the boiler.

The protection scope conferred to the present invention is determined by the content of the claims, properly interpreted in the light of the description. However, the person skilled in the art, in order to face contingent needs within his/her own capabilities, could apply modifications and changes to the invention within the protection scope itself.

The invention claimed is:

1. A transportation system for transporting loose material containing fines, the system comprising:
   a closed plate conveyor supported by chains or metallic belt; and
   a device for recovering fines from a bottom of said plate conveyor, the device having a substantially loop-like structure and adapted to also move fine material, the device comprising:
   a fixed frame;
   a plurality of collecting members for collecting fines, the collecting members being mobile with respect to the frame around a closed path, wherein a collection phase for collecting the fines from the bottom of said conveyor and a discharging phase for discharging the fines onto the conveyor for recycling of the fines are provided;
   a plurality of loading or discharging regions interfacing with the conveyor at interface regions; and
   moving means for moving the plurality of collecting members, the moving means being arranged as a catenary link,
   wherein said plate conveyor comprises collecting members for collecting fines, the collecting members being configured to convey the fines towards the device.

2. The system of claim 1, where the collecting members are cup shaped dragging members.

3. The system of claim 1, wherein the collecting members are arranged with a substantially constant distance from each other.

4. The system of claim 1, wherein the closed path is a substantially quadrilateral close path.

5. The system of claim 1, further comprising confining means for confining fine material.

6. The system of claim 5, wherein the confining means comprise abutment members cooperating with the collecting members.

7. The system of claim 1, wherein the collection phase takes place at a lower portion of the closed path and the discharging phase takes place at an upper portion of the closed path.

8. The system of claim 1, further comprising:
   a tensioning system; and
   a traction organ for a catenary of said collecting members, the traction organ comprising an upper branch and a lower branch,
   wherein the tensioning system is adapted to provide absence of any contact of said collecting members from a bottom of the upper and lower branches.

9. The system of claim 1, further comprising, at said interface regions, separation means for separation of environments.

10. The transportation system of claim 1, wherein the collecting members are pendulum and/or pusher collecting members.

11. The transportation system of claim 1, wherein the collecting members are hinged to transport plates of the conveyor.

12. The transportation system of claim 1, wherein the device is positioned upstream of a loading point of the conveyor.

13. The transportation system of claim 1, further comprising conveying means for conveying the fines from the conveyor to the device and vice versa.

14. The transportation system of claim 13, wherein the conveying means are channel or hopper conveying means.

15. The transportation system of claim 13, wherein the conveying means comprise separation means for separation of environments.

16. The transportation system of claim 1, said transportation system being a plant for extracting ashes.

17. A method for recovering fines from a bottom of a closed conveyor in plants where loose material containing fines is transported, the method comprising:
   moving the fines out of the conveyor in a closed path;
   providing, along the closed path, a collection phase where the fines are collected from the bottom of the conveyor wherein the collection phase occurs within the device according to claim 1; and
   providing, along the closed path, a discharging phase where the fines are discharged on the conveyor for recycling of the fines wherein the discharging phase occurs within the device according to claim 1.

18. The method of claim 17, wherein the closed path is a substantially quadrilateral close path.

19. The method of claim 17, wherein moving the fines comprises moving the fines upstream of a loading point of the conveyor.

20. The method of claim 17, wherein the collection phase takes place at a lower portion of the closed path and the discharging phase takes place at an upper portion of the closed path.

21. The transportation system according to claim 1, wherein the device comprises one loading region and one discharging region.

* * * * *

UNITED STATES PATENT AND TRADEMARK OFFICE
CERTIFICATE OF CORRECTION

PATENT NO.       : 8,567,594 B2
APPLICATION NO.  : 12/991949
DATED            : October 29, 2013
INVENTOR(S)      : Mario Magaldi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 467 days.

Signed and Sealed this

Fifteenth Day of September, 2015

Michelle K. Lee
*Director of the United States Patent and Trademark Office*